(12) United States Patent
Spear et al.

(10) Patent No.: US 6,815,640 B1
(45) Date of Patent: Nov. 9, 2004

(54) APPARATUS, SYSTEM AND METHOD TO FACILITATE RECONFIGURABLE WELDING POWER SUPPLY

(75) Inventors: Theresa Chih-Lei Miao Spear, Highland Heights, OH (US); George Daryl Blankenship, Chardon, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 0 days.

(21) Appl. No.: 10/191,230

(22) Filed: Jul. 9, 2002

(51) Int. Cl.[7] .................................................. B23K 9/10
(52) U.S. Cl. ................................................... 219/130.5
(58) Field of Search ........................ 219/130.5, 130.01, 219/137 PS; 702/34

(56) References Cited

U.S. PATENT DOCUMENTS

| | | | |
|---|---|---|---|
| 5,991,169 A | 11/1999 | Kooken | |
| 6,091,612 A | 7/2000 | Blankenship | |
| 6,472,634 B1 * | 10/2002 | Houston et al. | 219/130.5 |
| 6,479,792 B1 * | 11/2002 | Beiermann et al. | 219/130.5 |
| 6,504,131 B1 * | 1/2003 | Hayes | 219/130.01 |
| 2003/0062351 A1 * | 4/2003 | Davidson et al. | 219/130.5 |

OTHER PUBLICATIONS

"IrDa Infrared Communications: An Overview"; Patrick J. Megowan, et al.; Counterpoint Systems Foundry.

* cited by examiner

Primary Examiner—Clifford C. Shaw
(74) Attorney, Agent, or Firm—Amin & Turocy, LLP (57) ABSTRACT

An apparatus, system and method for a welding power supply adapted to be reconfigured is provided. The welding power supply includes a power supply control and a power supply control data store. Optionally, the welding power supply can include a communications component, an I/O component, a wire feed control component and a welding procedure(s) store. The welding power supply can provide information regarding configuration of the welding power supply to other welding power supplies and remote system (s) to facilitate troubleshooting, servicing, operating, maintenance and/or upgrading of the welding power supply. The invention further comprises a methodology for providing configuration information to a welding power supply.

20 Claims, 10 Drawing Sheets

APPARATUS, SYSTEM AND METHOD TO FACILITATE RECONFIGURABLE WELDING POWER SUPPLY

TECHNICAL FIELD

The present invention relates generally to computer and welding systems, and more particularly to an apparatus, system and method of facilitating a reconfigurable welding power supply.

BACKGROUND OF THE INVENTION

Welding power supplies are an integral part of electric arc welding systems. Welding systems may involve movement of a consumable electrode, for example, toward a work piece while current is passed through the electrode and across an arc developed between the electrode and the work piece. The electrode may be a non-consumable or consumable type, wherein portions of the electrode may be melted and deposited on the work piece. Power to the electrode is supplied by welding power supplies.

With increasing frequency, welding power supplies are utilized to perform a multiplicity of welding task(s) in, for example, the manufacturing industry. Given the nature and requirements of modern, complex manufacturing operations, however, welding systems designers, architects and suppliers face increasing challenges in regard to upgrading, maintaining, controlling and servicing various welding locations. Thus, controlling, maintaining and servicing multiple and isolated locations in large centers and/or across the globe has become more challenging, time consuming and expensive.

One such challenge relates to configuring welding power supplies to perform more than one welding task. For example, a welding power supply may be configured with regard to performing one welding task during a specific period of time and configured with regard to performing a second welding task thereafter.

Another challenge facing welding power supplies relates to maintenance. Welding power supplies are often maintained and serviced according to procedures implemented by operators of the welding power supplies. Although some operators may adequately service and maintain these welding power supplies, quality of the service and maintenance is often up to the training and competence of the individual operator. Thus, a large collection of well-maintained welding systems, including welding power supplies, servicing an overall assembly process may be at the mercy of another welding system that is not properly serviced or maintained. This may cause the process to stop or be disrupted during service outages relating to a poorly maintained welder, involving, for example, a welding power supply.

SUMMARY

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description that is presented later.

The present invention relates to an apparatus, system and method facilitating a welding power supply adapted to be reconfigured. In accordance with an aspect of the present invention, a welding power supply has at least one power supply control and a power supply configuration data store. The power supply control can command a power output of the welding power supply. The power supply configuration data store can store information, component change(s) and history associated with the power supply control. For example, the power supply configuration data store can store a date of configuration of the power supply control, a time of configuration of the power supply control, a hardware configuration of the welding power supply, a software version of the power supply control, a serial number and/or an identification of the power supply control, welding procedures installed in the welding power supply and/or a memory capacity of the welding power supply. The information stored in the power supply configuration data store can facilitate troubleshooting, servicing, operating, maintenance and/or upgrading of the welding power supply.

In accordance with another aspect of the present invention, a welding power supply can have an I/O component, a wire feed control component, a communications component and/or a welding procedure(s) data store. The I/O component can receive input signal(s) from node(s) of welding system(s). Based at least in part upon information from the I/O component, the power supply control can provide a power output to an output port. The wire feed control component can facilitate a rate of delivery of consumable wire utilized in the welding process. The communications component can facilitate communication between the welding power supply and remote system(s), for example, to facilitate troubleshooting, servicing, operating, maintenance and/or upgrading of the welding power supply. The communications component can be adapted for wireless communication utilizing a frequency adjusting wireless communication protocol (e.g., Bluetooth) with the remote system. Further, the welding power supply can be operatively coupled via a network to the remote system.

According to another aspect of the present invention, a remote system can, optionally, include a security component facilitating validation and/or verification of a welding power supply.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DESCRIPTION OF THE INVENTION

The present invention is now described with reference to the drawings, wherein like reference numerals are used to refer to like elements throughout. In the following description, for purposes of explanation, numerous specific details are set forth in order to provide a thorough understanding of the present invention. It may be evident to one skilled in the art that the present invention may be practiced without these specific details. In other instances, well-known structures and devices are shown in block diagram form in order to facilitate description of the present invention.

As used in this application, the term "component" is intended to refer to a electronic and/or computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component.

A "node" of a welding cell refers to a physical hardware component of a welding system including, but not limited to, a wire feeder, contact tip, dresser, gas mixer, gas sneezer, gas controller, clamp actuator, travel carriage/part manipulator, robot arm/beam/torch manipulator, laser seam tracker, other input/output devices and welding power source. "Welding cell" refers to a grouping of physical hardware components (nodes). It is to be appreciated that a node and/or welding cell can comprise a combination of hardware and software or in some cases simply software (e.g., virtual node or welding cell).

"Welding procedure" refers to a step or steps involved in a joining process and can include consumables to be used in the process along with settings for various aspects of a welding system before, during and/or after the joining process. For example, some of these aspects relate to control of power and waveforms supplied to an electrode, movements or travel of a welding tip during welding, electrode travel to other welding points, gas control to protect a molten weld pool from oxidation at elevated temperatures and provide ionized plasma for an arc, and other aspects such as arc stability to control quality of the weld.

"Post second generation service" (e.g., third generation (3G)) refers to mobile communication technology providing capability for high speed packet data (e.g., associated with streaming video and/or voice transmittal), for example, CDMA 2000 and/or Wide Band CDMA (WCDMA). Post second generation technology can also include reprogrammable software embedded in mobile communication device(s) (e.g., mobile phone), thus allowing for additional functionality of hardware employed for radio communication. Post second generation technology can also include cognitive technology whereby mobile device(s) negotiate with owner(s)/manager(s) of frequency channel(s) for temporary use of the frequency.

Figure 1:
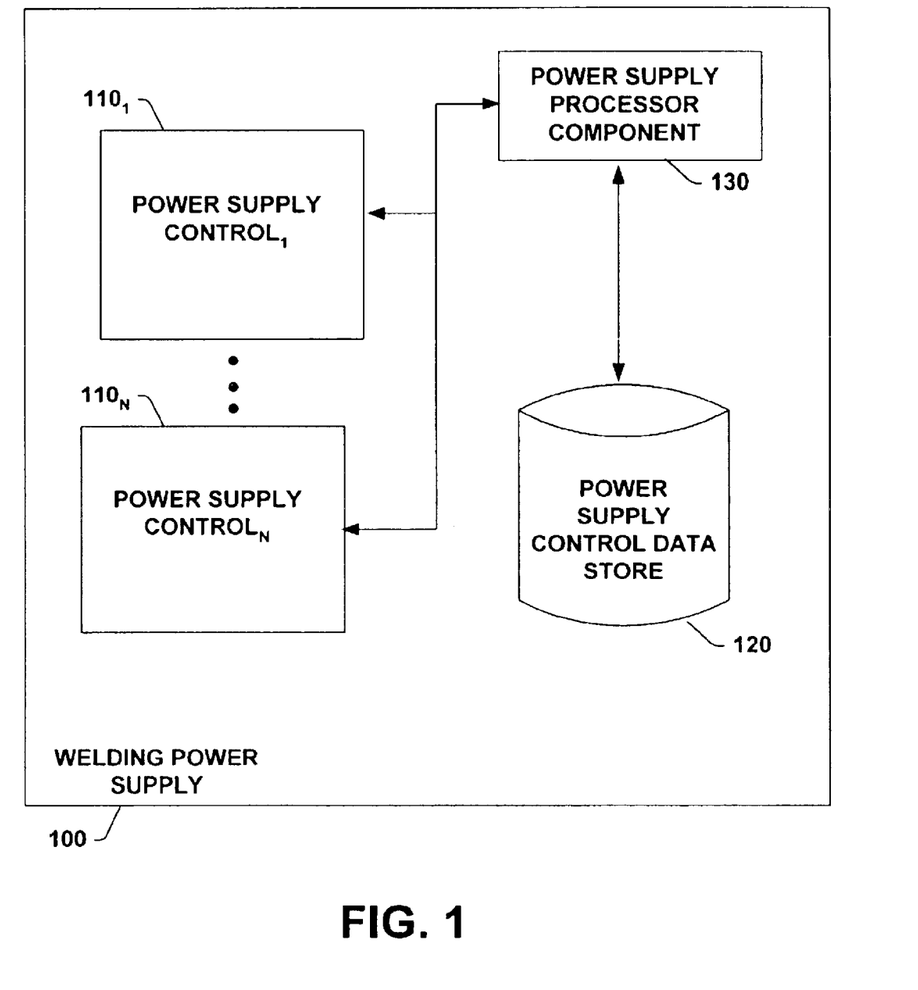
FIG. 1 is a schematic block diagram illustrating a welding power supply in accordance with an aspect of the present invention.

Referring to FIG. 1, a welding power supply 100 in accordance with an aspect of the present invention is illustrated. The welding power supply 100 includes a first power supply control $110_1$ through an Nth power supply control $110_N$, N being an integer greater to or equal to one. The power supply control s $110_1$ through $110_N$ can be referred to collectively as the power supply control 110. The welding power supply 100 further includes a power supply configuration data store 120 and a power supply process component 130.

The power supply control 110 can command a power output of the welding power supply 100. For example, the power supply control 110 can control the voltage and/or current of the power output of the welding power supply 100.

The power supply configuration data store 120 can store information, component change(s), and history associated with the power supply control 110 and/or the welding power supply 100. For example, the power supply configuration data store 120 can store a date of configuration of the power supply control 110, a time of configuration of the power supply control 110, a hardware configuration of the welding power supply 100, a software version of the power supply control 110, a serial number and/or an identification of the power supply control 110, a welding program installed in the welding power supply 100 and/or a memory capacity of the welding power supply 100. The information stored in the power supply configuration data store 120 can facilitate troubleshooting, servicing, operating, maintenance and/or upgrading of the welding power supply 100.

The power supply process component 130 can facilitate reconfiguration of the power supply control 110 based, at least in part, upon information stored in the power supply control data store 120. For example, the power supply processor component 130 can facilitate sending information (e.g., voltage setting(s), waveform(s) and/or current setting(s)) to the power supply control 110.

Figure 1A:
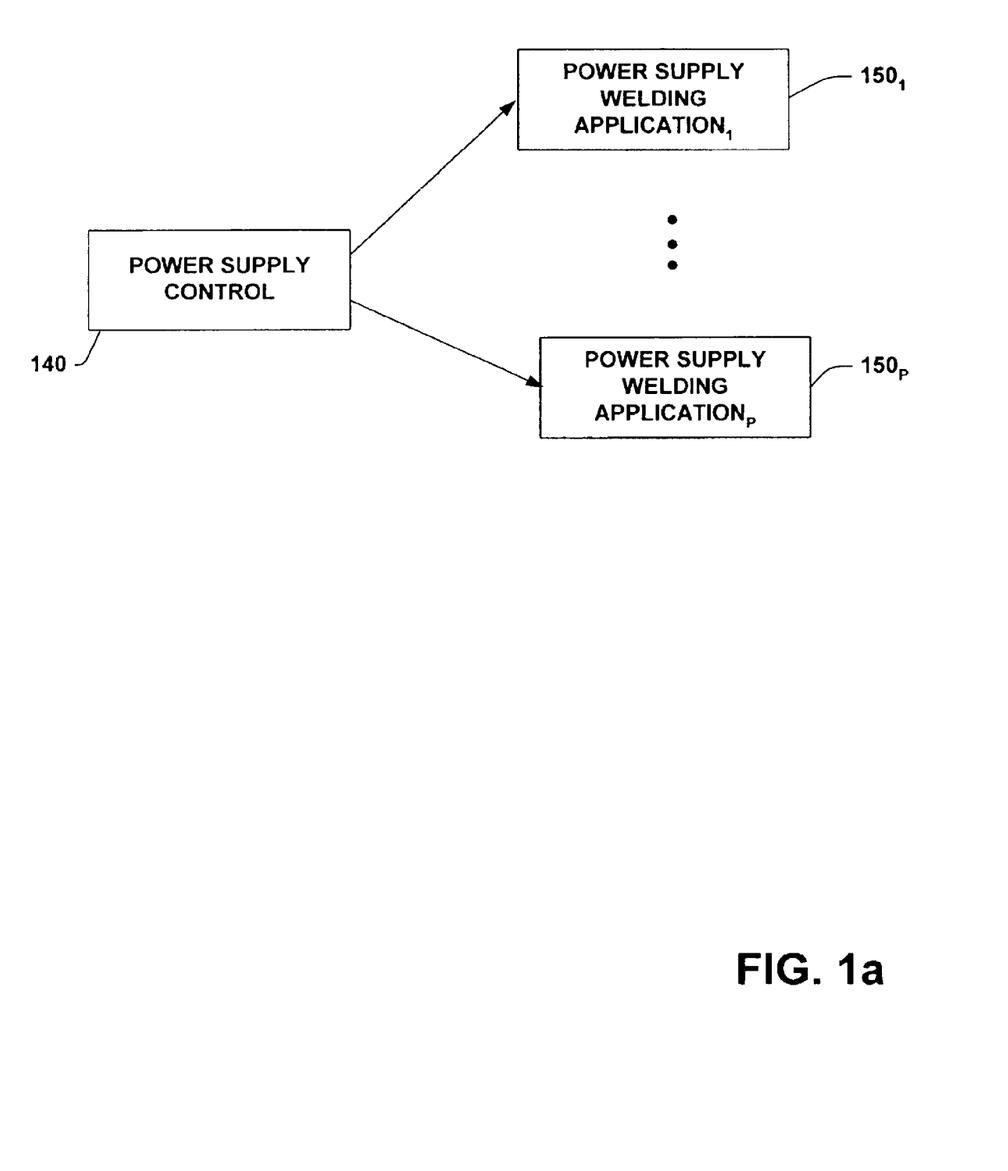
FIG. 1a is a schematic block diagram illustrating a welding power supply control in accordance with an aspect of the present invention.

Referring next to FIG. 1a, a welding power supply control 140 in accordance with an aspect of the present invention is illustrated. The power supply control 140 can be adapted to be reconfigured for a first power supply welding application $150_1$ through a Pth power supply welding application $150_P$, P being an integer greater to or equal to one. For example, in order to facilitate welding a first part, the power supply control 140 can be configured to operate as the first power supply welding application $150_1$. Thereafter, in order to facilitate welding a different part, the power supply control 140 can be reconfigured to operate as a second power supply welding application $150_2$ (e.g., having different voltage setting(s), waveform(s) and/or current setting(s)).

Figure 2:
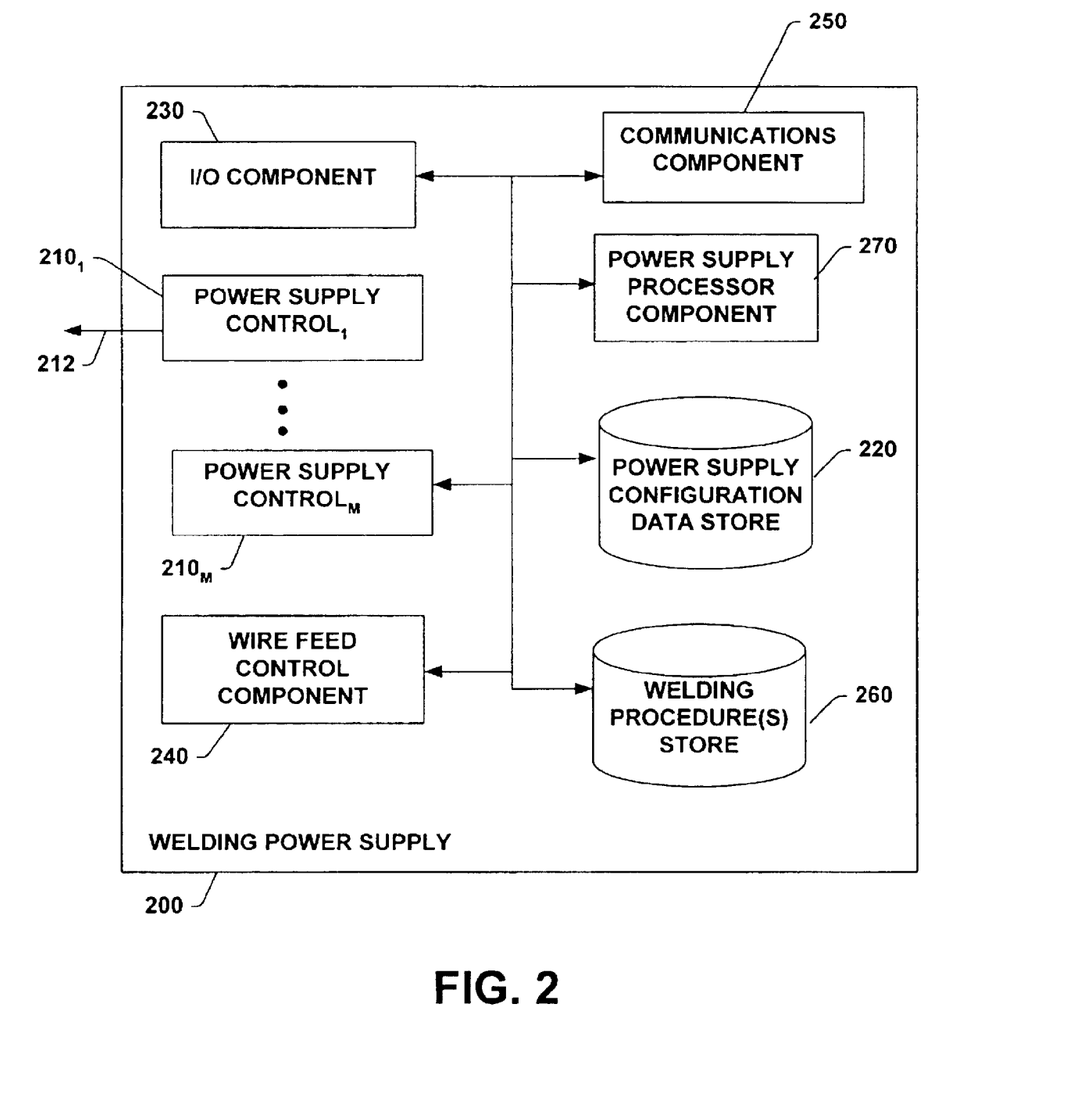
FIG. 2 is a schematic block diagram illustrating a welding power supply in accordance with an aspect of the present invention.

Turning to FIG. 2, a welding power supply 200 in accordance with an aspect of the present invention is illustrated. The welding power supply 200 includes a first power supply control $210_1$ through an Mth power supply control $210_M$, M being an integer greater to or equal to one. The power supply controls $210_1$ through $210_M$ can be referred to collectively as the power supply control 210. The welding power supply 200 further includes a power supply configuration data store 220 and a power supply process component 270. Optionally, the welding power supply 200 can include an I/O component 230, a wire feed control component 240, a communications component 250 and/or a welding procedure(s) data store 260.

The power supply control 210 can command various parameters of a power output of the welding power supply 200. The power supply control 210 can define shape(s) of waveform(s) to control the voltage and/or current of the power output of the welding power supply 200 to perform different type of welding processes. For example, the power supply 200 can be utilized to perform gas metal arc welding (GMAW), flux cored arc welding, metal cored arc welding, submerged arc welding (SAW), narrow groove welding, gas tungsten arc (GTAW) welding, plasma arc welding, electron beam and laser welding, hard surfacing welding, arc gouging and/or manual shielded arc welding (SMAW).

The power supply configuration data store 220 can store information associated with the power supply control 210 and/or the welding power supply 200. For example, the power supply configuration data store 220 can store a date of configuration of the power supply control 210, a time of configuration of the power supply control 210, a hardware configuration of the welding power supply 200, a software version of the power supply control 210, a serial number and/or an identification of the power supply control 210, a welding program installed in the welding power supply 200 and/or a memory capacity of the welding power supply 200. The information stored in the power supply configuration data store 220 can facilitate troubleshooting, servicing, operating, maintenance and/or upgrading of the welding power supply 200.

The power supply process component 270 can facilitate reconfiguration of the power supply control 210 based, at least in part, upon information stored in the power supply control data store 220. For example, the power supply processor component 270 can facilitate sending information (e.g., voltage setting(s), waveform(s) and/or current setting (s)) to the power supply control 210.

The I/O component 230 can receive input signal(s) from node(s) of welding system(s). For example, the I/O component 230 can receive an input signal from a proximity switch indicating that a work piece is physically present. Based at least in part upon information from the I/O component 230, the power supply control 210 can provide a power output to an output port 212. Additionally, the I/O component 230 can send output signal(s) to node(s) of the welding system(s).

The wire feed control component 240 can facilitate a rate of delivery of consumable wire utilized in the welding process.

The communications component 250 can facilitate communication between the welding power supply 200 and remote system(s) (not shown) (e.g., another welding power supply, a personal digital assistant, a local computer system and/or a remote computer system). For example, the communications component 250 can retrieve information stored in the power supply configuration data store 220 and transmit the information to the remote system(s) (not shown) to facilitate troubleshooting, servicing, operating, maintenance and/or upgrading of the welding power supply 200. By identifying, for example, a time of configuration of the power supply control 210, component change detail, and history of configuration of the power supply control 210 to the remote system (not shown), the communications component 250 can enable to a welding technician located in a remote physical location from the welding power supply 200 to troubleshoot the welding power supply 200.

Figure 3:
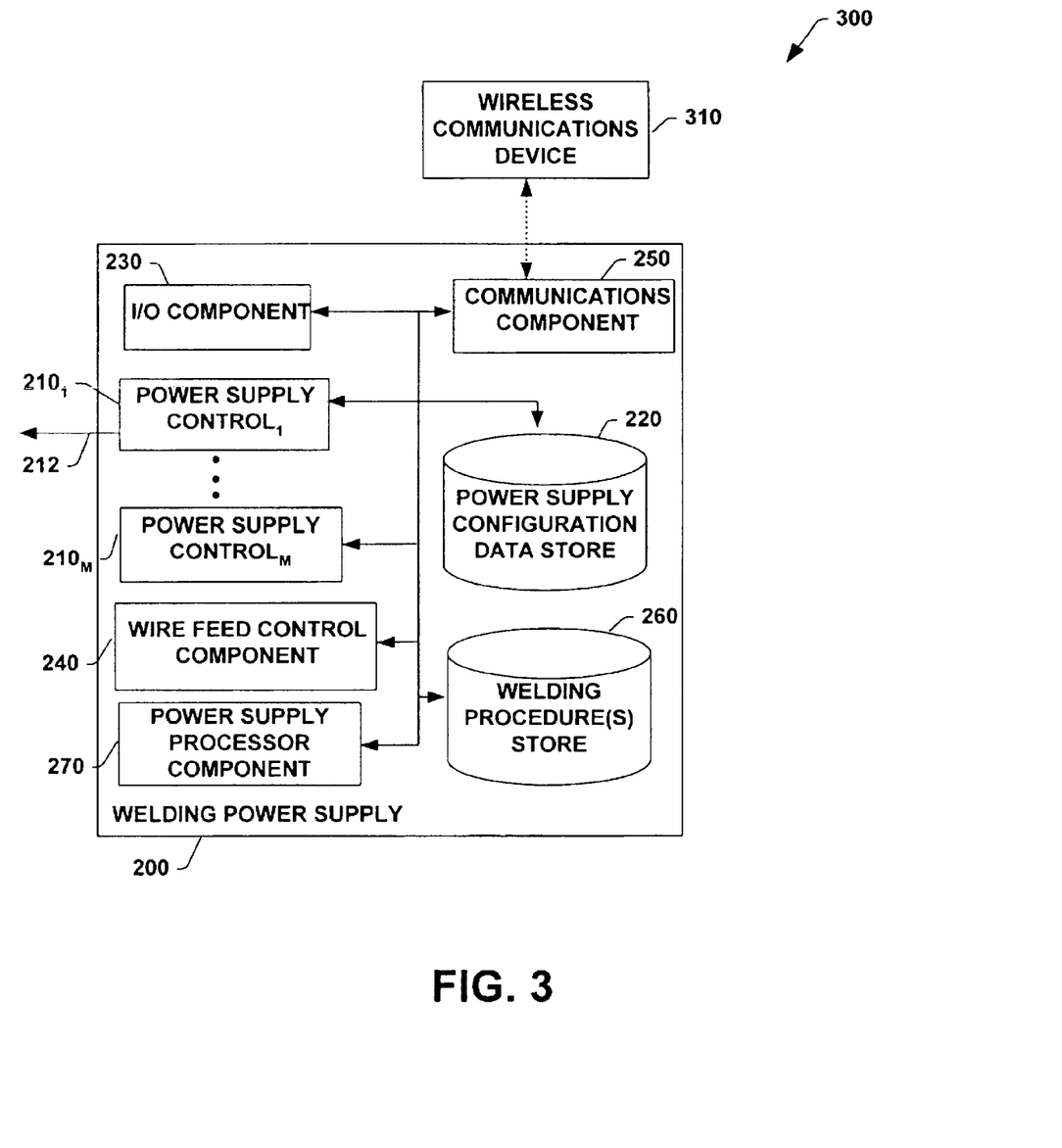
FIG. 3 is a schematic block diagram illustrating a welding system in accordance with an aspect of the present invention.

The communications component 250 can be adapted for wireless communication utilizing a frequency adjusting wireless communication protocol (e.g., Bluetooth) with a remote system (not shown). Turning to FIG. 3, a welding system 300 in accordance with an aspect of the present invention is illustrated. The welding system 300 includes a welding power supply 200 and a wireless communications device 310 (e.g., a personal digital assistant, such as a Palm Pilot, adapted for wireless communication). The wireless communications device 310 can come in close proximity (e.g., within 10 meters) of the welding power supply 200, for example, to retrieve and/or examine content(s) of the power supply configuration data store 220. The wireless communications device 310 can further be adapted to send information to the welding power supply 200 (e.g., welding procedure(s)). It is to be appreciated that the communications component 250 can further be adapted to communicate with other welding nodes via a communications link, for example Arclink Weld Communications Standard, thus further facilitating the transfer of information stored in the power supply configuration data store 220.

Turning back to FIG. 2, the communications component 250 can couple the welding power supply 200 to remote system(s) (not shown) utilizing, for example, Ethernet (IEEE 802.3), Wireless Ethernet (IEEE 802.11), PPP (point-to-point protocol), point-to-multipoint short-range RF (Radio Frequency), WAP (Wireless Application Protocol), Bluetooth, IP, IPv6, TCP and User Datagram Protocol (UDP). Further, the communications component 250 can communicate via an extranet and/or a shared private network.

The communications component 250 can utilize post second generation mobile communications technology (e.g., 3G) to communicate with other device(s) (e.g., WAP gateway). The communications component 250 can include software that is reprogrammable. The communications component 250 can further communicate via one channel and/or shift among multiple channels, for example, depending on the type of communication being performed (e.g., voice, data and/or high-speed data). The communications component 250 can further be adapted to utilize a particular communications modality based upon, for example, upon a priority level. Further, the communications component 250 can be adapted to perform cognitive function(s) to facilitate communications. For example, the communications component 250 can determine frequencies available for communication (e.g., temporary use), determine cost(s) associated with communication on each of the frequencies, negotiate usage rights with the owner(s) of the channels. Additionally, the communications component 250 can further monitor the quality of transmission and/or receipt of information and adaptively modify the transmission frequency. It is to be appreciated that the communications component 250 can include means for mobile communications that are embedded within the welding power supply 200, for example a printed circuit equipped with a mobile communication chip set (not shown), and/or external to the welding power supply 200, for example, a mobile phone (not shown) serving as a mobile communication modem for the welding power supply 200.

In one implementation, the communications component 250 can be adapted for infrared communications utilizing, for example, Infrared Data Association (IrDA) protocol(s). The communications component 250 can implement one or more of the IrDA protocol layer(s): physical layer, link access protocol (IrLAP), link management protocol (IrLMP), information access service (IAS), tiny transport protocol (TinyTP), object exchange protocol (IrOBEX), serial and parallel port emulation (IrComm) and/or local area network access (IrLan).he welding procedure(s) data store 260 can store welding procedure(s) available for the welding power supply 200. For example, multiple welding procedure(s) can be stored in the welding power supply 200 to be available for operator selection (e.g., based upon customer part number and/or type(s) of materials involved in the welding process). Further, welding procedure(s) can be transferred to the welding procedure(s) data store 260 via the communications component 250 from a remote system (not shown). For example, the remote system (not shown) can transfer welding procedure(s) to the welding power supply 200 based, at least in part, upon information stored in the power supply configuration data store 220 and/or the welding task(s) to be performed.

Figure 4:
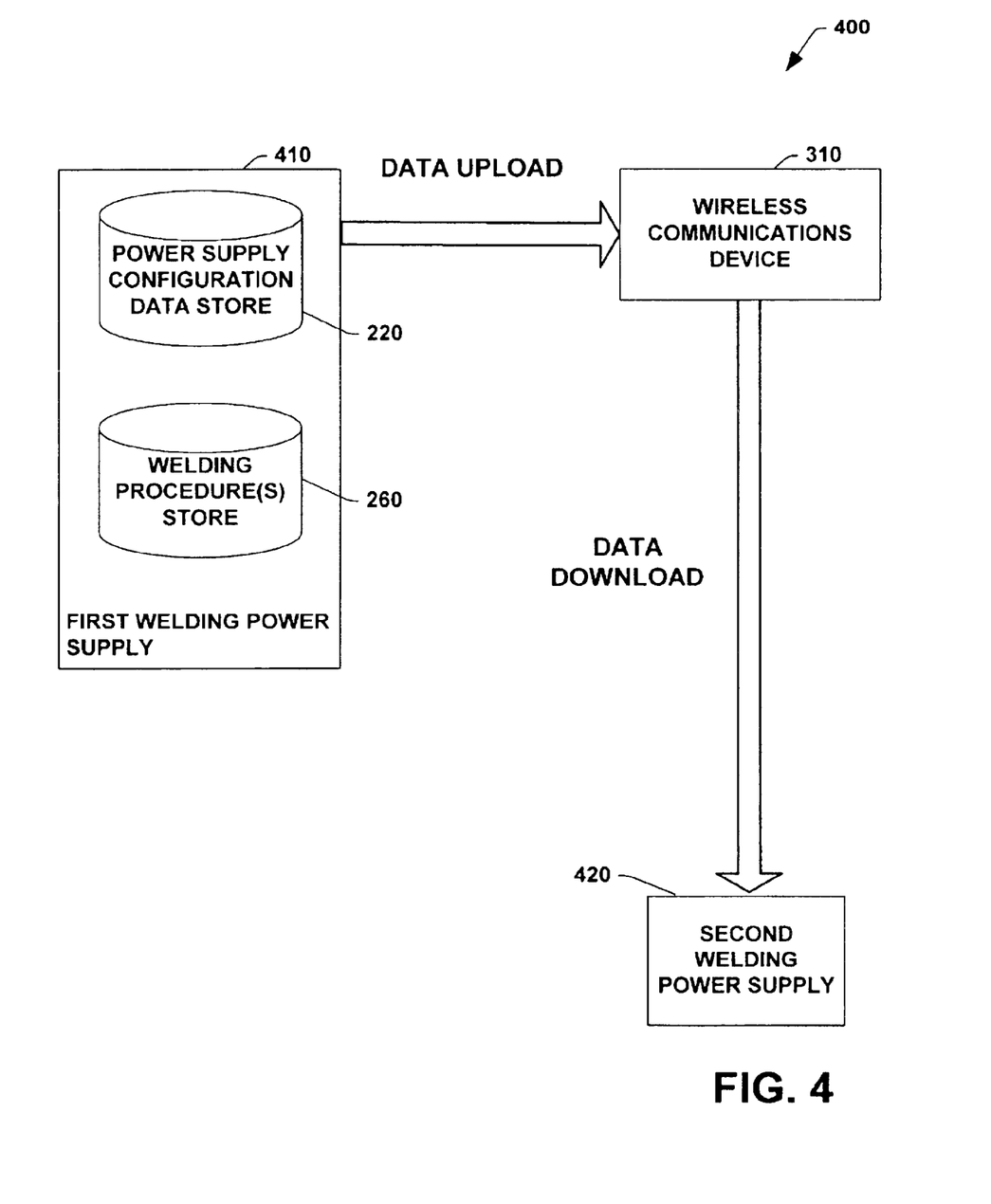
FIG. 4 is a schematic block diagram illustrating a wireless welding power supply configuration system in accordance with an aspect of the present invention.

Turning to FIG. 4, a wireless welding power supply configuration system 400 in accordance with an aspect of the present invention is illustrated. A wireless communications device 310 can receive information stored in a power supply configuration data store 220 and/or a welding procedure(s) store 260 of a first welding power supply 410. For example, the wireless communications device 310 can receive information stored in the power supply configuration data store 220 and/or the welding procedure(s) store 260 of the first welding power supply 410. Thereafter, the wireless communications device 310 can then provide at least some of the information received to a second welding power supply 420, thus effectively "cloning" the first welding power supply 410.

Figure 5:
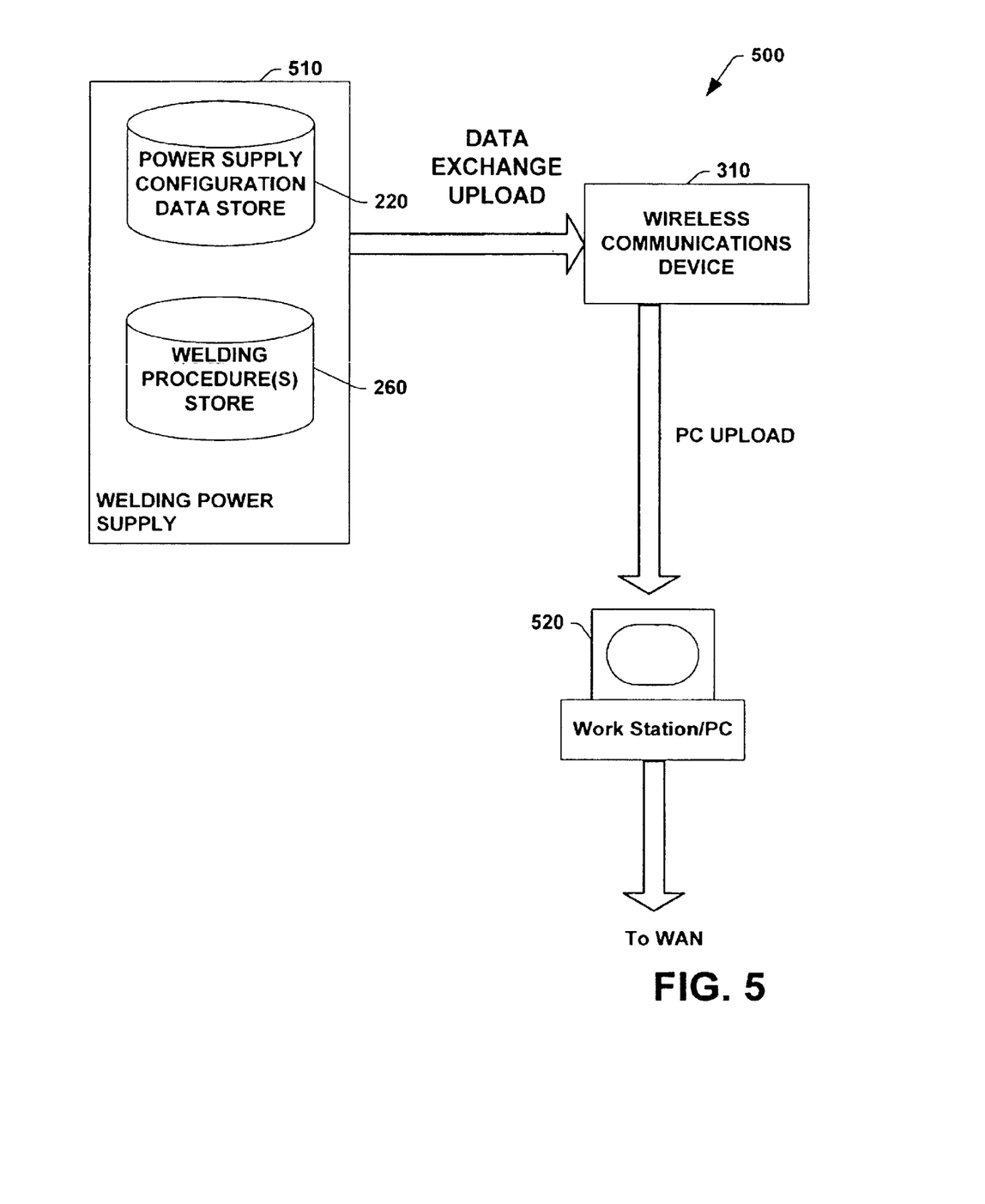
FIG. 5 is a schematic block diagram illustrating a wireless communications storage system in accordance with an aspect of the present invention.

Referring briefly to FIG. 5, a wireless communications storage system 500 in accordance with an aspect of the present invention is illustrated. A wireless communications device 310 can receive information stored in a power supply configuration data store 220 and/or a welding procedure(s) store 260 of a welding power supply 510. The wireless communications device 310 can then provide at least some of the information received from the welding power supply 510 to a work station/PC 520, for example, to facilitate archiving of information (e.g., in case of catastrophic damage to the first welding power supply). Optionally, the work station/PC 520 can provide at least some of the information received from the wireless communications device 310 to remote system(s) (not shown) (e.g., via a WAN) to further facilitate archiving of information.

Figure 6:
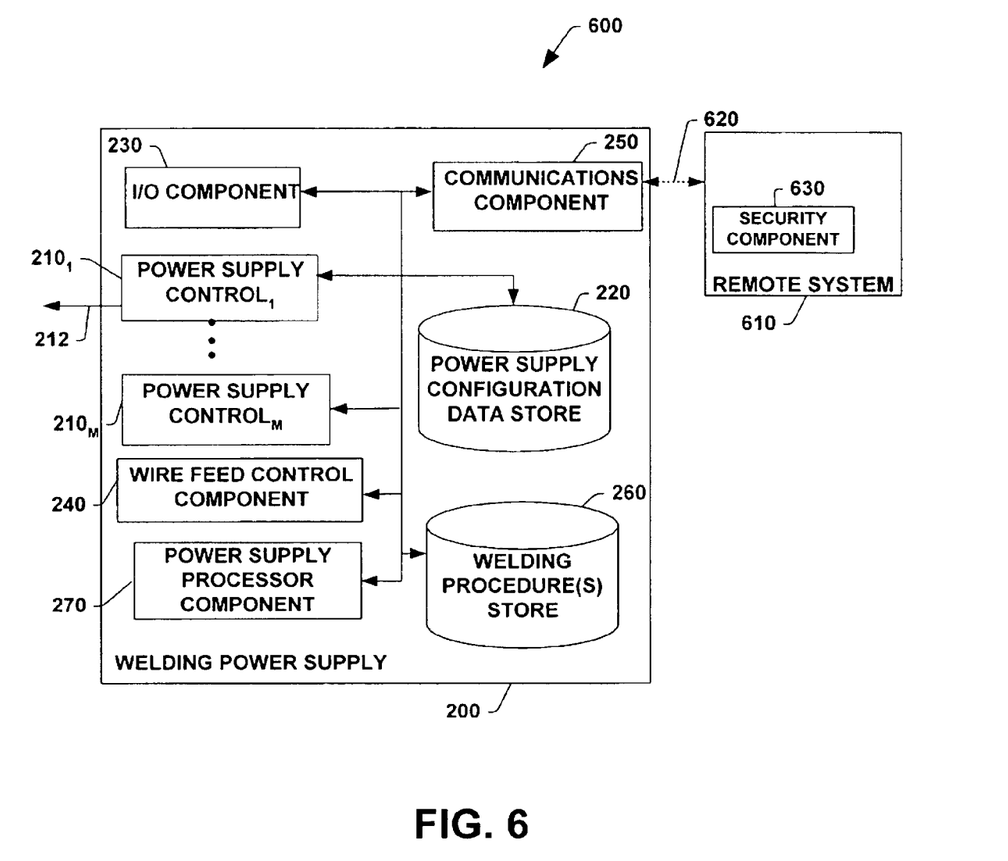
FIG. 6 is a schematic block diagram illustrating a welding system in accordance with an aspect of the present invention.

Next, referring to FIG. 6, a welding system 600 in accordance with an aspect of the present invention is illustrated. The welding system 600 includes a welding power supply 200 and a remote system 610 (e.g., Programmable Logic Device (PLD), Field-Programmable Gate Array (FPGA) and/or microprocessor based computer). The welding power supply 200 is operatively coupled via a network 620 to the remote system 610. For example, the network 620 can employ Ethernet (IEEE 802.3), Wireless Ethernet (IEEE 802.11), PPP (point-to-point protocol), point-to-multipoint short-range RF (Radio Frequency), WAP (Wireless Application Protocol), Bluetooth, IP, IPv6, TCP, IrDA protocol(s) and User Datagram Protocol (UDP). Further, the network connection can be via an extranet and/or a shared private network. For example, the network connection can be via a phone connection (not shown) from the welding power supply 200 to an Internet Service Provider (ISP) to the remote system 610. Another possible network connection is via a Local Area Network (LAN) to the remote system 610. Information exchanged between and among the welding power supply 200 and the remote system 610 can be in a variety of formats and can include, but is not limited to, such technologies as ASCII text files, HTML, SHTML, VB Script, JAVA, CGI Script, JAVA Script, dynamic HTML, PPP, RPC, TELNET, TCP/IP, FTP, ASP, XML, PDF, EDI, WML as well as other formats.

The remote system 610 can, optionally, include a security component 630. The security component 630 facilitates secure communication between the welding power supply 200 and the remote system 610. Given that welding information may be transferred over public networks such as the Internet, the security component 630 can provide encrypted data communications along with authentication and authorization services between the remote system 610 and the welding power supply 200. Authentication refers to a determination that a purported user or welding power supply 200 is whom they claim to be. Authorization is the process of verifying that a user or welding power supply 200 has been authorized by the remote system 610 to access welding information. Encryption is the conversion of data into a form, such as a ciphertest, that is not easily understood by unauthorized agents. For example, authentication, authorization, and non-repudiation may be established utilizing a Public Key Infrastructure (PKI) and X.509 Public Key Infrastructure Certificates to provide authentication and message integrity. Further, a Secure Sockets Layer (SSL) and Secure HTTP (SHTTP) may be employed to provide authentication and data encryption, wherein proprietary authentication and authorization techniques may be employed utilizing either publicly available encryption algorithms or those of custom design. These protocols, with the exception of those based on a custom design, are readily understood by those of ordinary skill in the art. They are defined in specifications provided in the Request for Comments (RFC) documents from the Internet Engineering Task Force (IETF) and in other sources.

The security component 630 can further employ encryption that can be established utilizing one or more of the following protocols. For example, a PGP, S/MIME protocol may be employed to provide encrypted email. An SSH and/or SSH2 protocol may be utilized to provide encrypted terminal sessions, wherein an Internet Protocol Security (IPSEC) protocol may be employed to provide data encryption. Cloaking techniques may also be employed utilizing either publicly available encryption algorithms and/or those of custom design. These protocols, with the exception those based on a custom design, are readily understood by those of ordinary skill in the art. They are defined in specifications provided in the appropriate Request for Comments (RFC) documents from the Internet Engineering Task Force (IETF) and in other sources.

Negotiations can occur between the security component 630 of the remote system 610 and the welding power supply 200. These negotiations may be utilized to establish a secure (e.g., encrypted) data channel, for example, between the TCP/IP drivers (not shown) of the welding power supply 200 and the remote system 610.

The security component 630 can further define access rights based upon the type of user/welding power supply 200 and/or the particular user/welding power supply 200. For example, a user having a single welder can be permitted access to welding information accessible to substantially all users while a user having hundreds of welders (e.g., automated factory) possibly spread across various geographical locations can be permitted access to welding information accessible to substantially all users along with information accessible to users associated with a particular entity (e.g., welding procedure(s) for particular part number(s) and/or plant location(s)). The security component 630 thus facilitates secure communication and/or validates access of information based at least in part upon access rights granted to the welding power supply 200 and/or a user.

Figure 7:
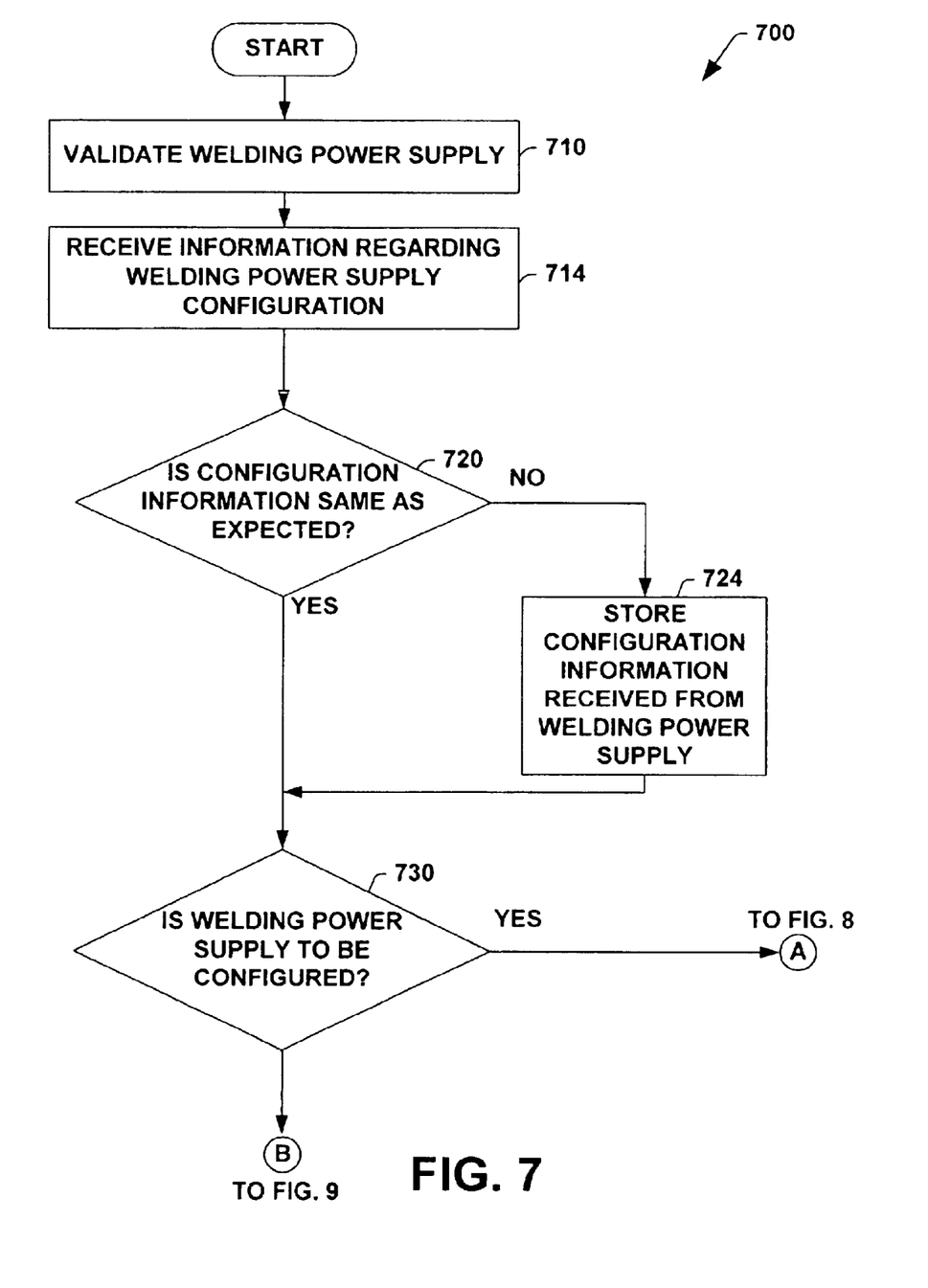
FIG. 7 is a flow chart diagram illustrating a methodology for providing configuration information to a welding power supply in accordance with the present invention.
Figure 8:
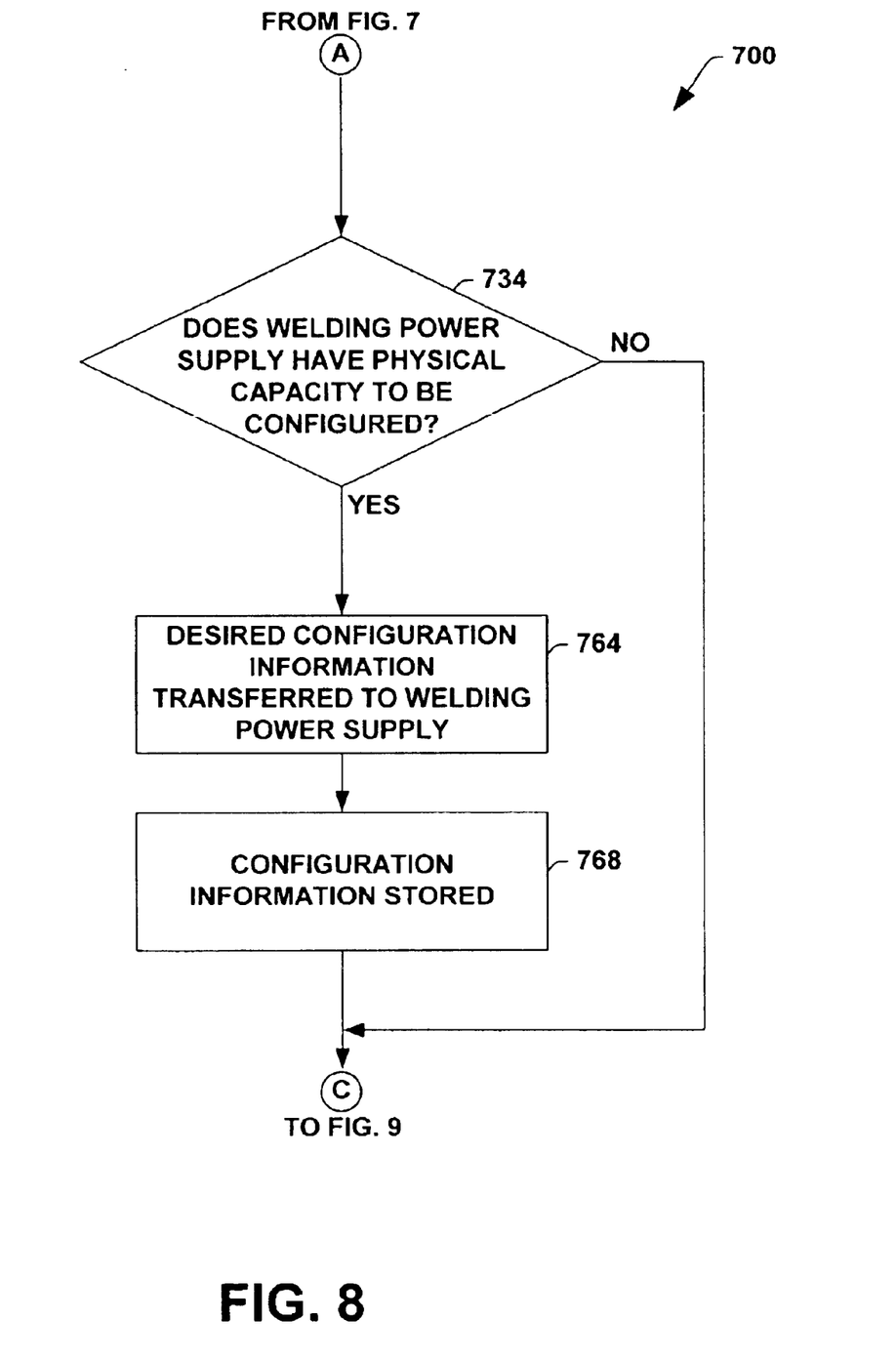
FIG. 8 is a flow chart diagram further illustrating the method of FIG. 7.
Figure 9:
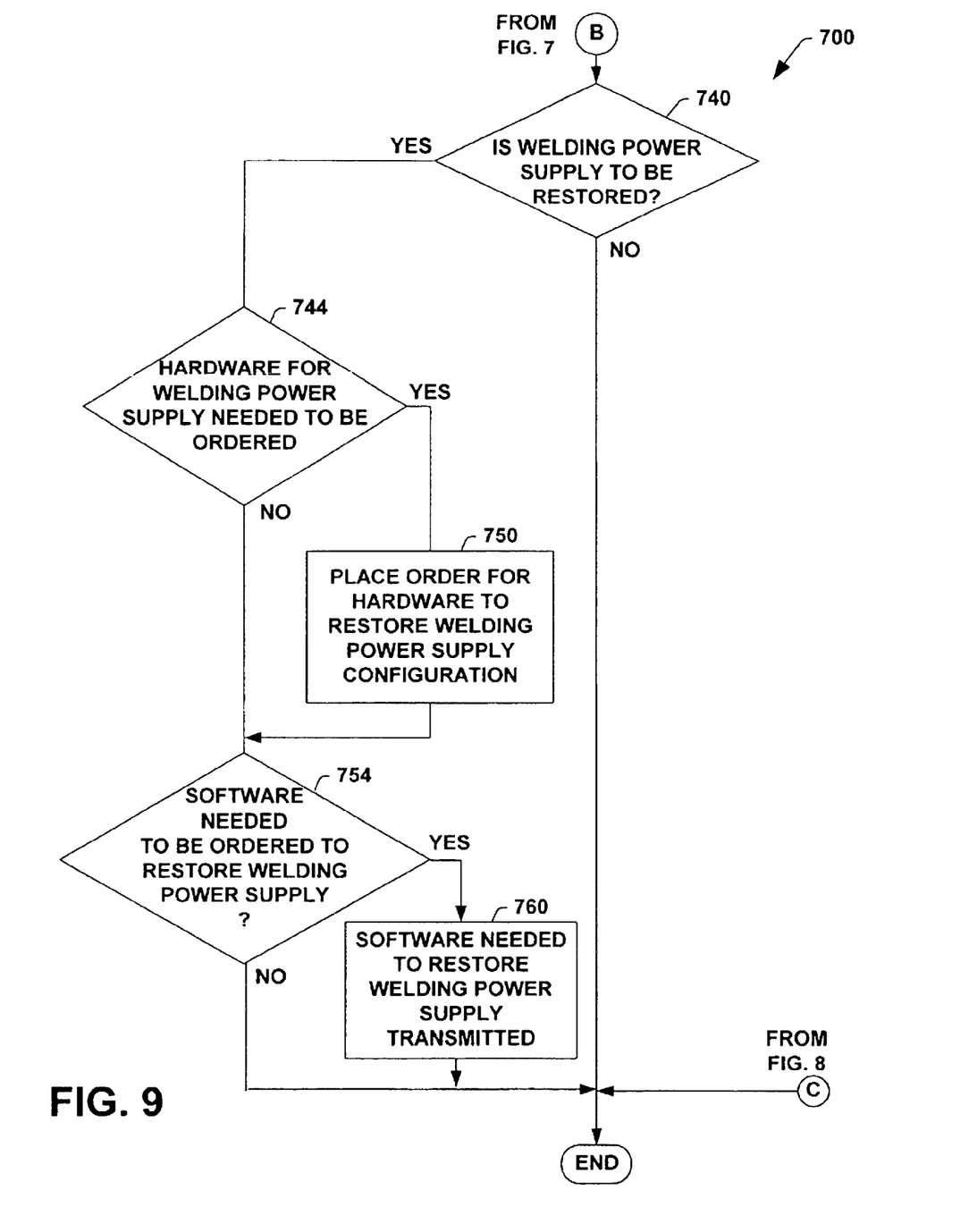
FIG. 9 is a flow chart diagram further illustrating the method of FIG. 7.

FIGS. 7, 8 and 9 illustrate a methodology for providing various aspects providing configuration information to a welding power supply in accordance with the present invention. The method comprises a group of actions or processes represented by blocks. While, for purposes of simplicity of explanation, the methodology is shown and described as a series of blocks, it is to be understood and appreciated that the present invention is not limited by the number or order of blocks, as some blocks may, in accordance with the present invention, occur in different orders and/or concurrently with other blocks from that shown and described herein. For example, those skilled in the art will understand and appreciate that a methodology could alternatively be represented as a series of interrelated states, such as in a state diagram. Moreover, not all illustrated acts may be required to implement a methodology in accordance with the present invention.

Turning to FIG. 7, a methodology 700 for providing configuration information to a welding power supply in accordance with the present invention is provided. Beginning at 710, a welding power supply is validated (e.g., determined to be an approved system user). At 714, configuration information regarding the welding power supply is received (e.g., retrieved from power supply configuration data store 220). At 720, at determination is made whether the configuration information is the same as expected (e.g., has not changed since last configuration). If the determination at 720 is NO, at 724, the configuration information received from the welding power supply is stored (e.g., on a remote system) and processing continues at 730. If the determination at 720 is YES, processing continues at 730. At 730, a determination is made as to whether the welding power supply is to be configured (e.g., with a different welding power supply configuration). If the determination at 730 is YES, at 734, a determination is made whether the welding power supply has physical capacity to be configured (e.g., enough memory to load the desired configuration). If the determination at 734 is YES, at 764, the desired configuration information is transferred to the welding power supply. At 768, the configuration information is stored (e.g., on a remote system) and no further processing occurs. If the determination at 734 is NO, no further processing occurs.

If the determination at 730 is NO, at 740 a determination is made whether the welding power supply is to be restored (e.g., based upon previously stored configuration information). If the determination at 740 is NO, no further processing occurs. If the determination at 740 is YES, at 744, a determination is made whether hardware for the welding power supply is needed to be order in order to restore the configuration. If the determination at 744 is YES, at 750, an order is placed for the hardware needed to restore the welding power supply configuration and processing continues at 754. If the determination at 744 is NO, processing continues at 754. At 754, a determination is made whether software is needed to be ordered in order to restore the welding power supply (e.g., welding procedure(s)). If the determination at 754 is NO, no further processing occurs. If the determination at 754 is YES, at 760, an order is placed for the software needed to restore the welding power supply is transmitted (e.g., via a network connection).

What has been described above are various aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A welding power supply, comprising:
   at least one power supply control that controls at least one of a voltage and a current of the welding power supply;
   a power supply configuration data store storing information associated with the at least one power supply control; and,
   a communications component that facilitates communication between the welding power supply and another entity, the communications component receives welding power supply configuration information, determines whether the welding power supply configuration information received is different than stored welding power supply configuration information, and stores the welding power supply configuration information if it is different than the stored welding power supply configuration information.

2. The welding power supply of claim 1, the information stored in the power supply configuration data store further comprising at least one of a date of configuration of the power supply control, a time of configuration of the power supply control, a hardware configuration of the welding power supply, a software version of the power supply control, a serial number of the power supply control, an identification of the power supply control, a welding program installed in the welding power supply, a component change history of the welding power supply and a memory capacity of the welding power supply.

3. The welding power supply of claim 1, the communication component facilitating communication between the welding power supply and at least one of another welding power supply, a personal digital assistant, a local system and a remote system.

4. The welding power supply of claim 3, the communication component further facilitating configuration of the welding power supply based at least in part upon information obtained from the at least one of another welding power supply, a personal digital assistant a local computer system and a remote computer system.

5. The welding power supply of claim 1, farther comprising an I/O component, a power output of the welding power supply based at least in part upon information associated with the I/O component.

6. The welding power supply of claim 1, further comprising a welding procedure store storing at least one welding procedure.

7. The welding power supply of claim 1, further comprising a wire feed control component controlling a welding wire supply utilized in a welding process.

8. A welding system, comprising:
   a welding power supply comprising at least one power supply control that controls at least one of a voltage and a current of the welding power supply, a power supply configuration data store storing information associated with the at least one power supply control and a communications component; and
   a remote system, the communications component facilitating communication between the welding power supply and the remote system, the communications component receives welding power supply configuration information from the remote system, determines whether the welding power supply configuration information received is different than stored welding power supply configuration information, and, stores the welding power supply configuration information if it is different than the stored welding power supply configuration information.

9. The welding system of claim 8, the communications component and the remote system communicating at least one of a date of configuration of the power supply control, a time of configuration of the power supply control, a hardware configuration of the welding power supply, a software version of the power supply control, a serial number of the power supply control, an identification of the power supply control, a welding program installed in the welding power supply, a component change of the welding power supply and a memory capacity of the welding power supply.

10. The welding system of claim 8, the communications component and the remote system communicating via at least one of a frequency adjusting wireless communication protocol, CDMA 2000 systems capacity, a post second generation service, an IrDA protocol and a third generation service.

11. The system of claim 8, the communications component of the welding power supply filter adapted to communicate with the remote system via at least one of a wide area network, a local area network, the Internet and a personal area network.

12. The welding system of claim 8, the welding system further comprising a security component facilitating secure communication utilizing at least one of a password login, a digital signature, data encryption, an authentication service and an authorization service.

13. The welding system of claim 8, the communications component and the remote system exchanging information via at least one of an ASCII text file, HTML, SHTML, VB Script, JAVA, CGI Script, JAVA Script, dynamic HTML, PPP, RPC, TELNET, TCP/IP, FTP, ASP, XML, PDF, EDI and WML.

14. The welding power supply of claim 8, further comprising a welding procedure store storing at least one welding procedure.

15. The welding system of claim 8, the remote system being one of a Programmable Logic Device, Field-Programmable Gate Array and a microprocessor based computer.

16. A method for facilitating configuration of a welding power supply, comprising:

receiving welding power supply configuration information;

determining whether the welding power supply configuration information received is different than stored welding power supply configuration information;

storing the welding power supply configuration information if it is different than the stored welding power supply configuration information; and providing welding power supply configuration information to a welding power supply.

17. The method of claim 16, the welding power supply configuration information comprising at least one of a date of configuration of the power supply control, a time of configuration of the power supply control, a hardware configuration of the welding power supply, a software version of the power supply control, a serial number of the power supply control, an identification of the power supply control, a welding program installed in the welding power supply, a component change history of the welding power supply and a memory capacity of the welding power supply.

18. The method of claim 16, further comprising at least one of the following acts:

determining whether the welding power supply is to be restored;

placing an order for either hardware or software associated with the welding power supply; and transmitting software for to be utilized by the welding power supply.

19. A signal for communicating between a welding power supply and a remote system, comprising:

welding power supply configuration information, the welding power supply configuration information facilitating at least one of restoration and configuration of a welding power supply, the welding power supply configuration information comprising a date of configuration of a power supply control.

20. The signal of claim 19, the welding power supply configuration information comprising at least one of at least one of a time of configuration of the power supply control, a hardware configuration of the welding power supply, a software version of the power supply control, a serial number of the power supply control, an identification of the power supply control, a welding program installed in the welding power supply, a component change history of the welding power supply and a memory capacity of the welding power supply.

* * * * *